United States Patent [19]

Ishimaru et al.

[11] 4,001,830
[45] Jan. 4, 1977

[54] RADIO RECEIVER SET WITH ROTATABLE ANTENNA
[75] Inventors: Satoshi Ishimaru, Kashiwara; Hiroshi Maeda, Sakai; Tatsuto Mizukami, Neyagawa, all of Japan
[73] Assignee: Matsushita Electric Industrial Company, Ltd., Osaka, Japan
[22] Filed: Aug. 18, 1975
[21] Appl. No.: 605,322
[30] Foreign Application Priority Data
   Aug. 20, 1974  Japan ............................ 49-100172
[52] U.S. Cl. ............................... 343/702; 343/788; 343/882
[51] Int. Cl.² ........................................ H01Q 1/24
[58] Field of Search ................... 343/702, 882, 788

[56] References Cited
UNITED STATES PATENTS 2,930,038   3/1960   Hoellerich et al. ................ 343/702
3,181,163   4/1965   Kozlow et al. ..................... 343/702

Primary Examiner—Eli Lieberman
Attorney, Agent, or Firm—Stevens, Davis, Miller & Mosher

[57] ABSTRACT

A radio receiver set having a rotary antenna device comprises a rotary body rotatably mounted to a top plate of a cabinet forming the radio receiver set, and an antenna housing case mounted to the rotary body in a manner which allows the adjustment of elevation angle, the antenna housing case being provided with holding means to retain a selected elevation angle position, whereby a maximum receiving sensitivity can be attained only by rotating said antenna housing case while it is held in a selected elevation angle with respect to the rotary body.

5 Claims, 9 Drawing Figures

RADIO RECEIVER SET WITH ROTATABLE ANTENNA

The present invention relates to a radio receiver set having a rod antenna such as a ferrite antenna, and it aims to construct the radio receiver set such that a maximum receiving sensitivity is attained regardless of the direction of mounting of the radio receiver set.

In general, in a portable radio receiver set, a rod antenna such as a ferrite antenna is fixed directly to a chassis or a printed circuit board in a cabinet. In such a type of radio receiver set, the receiving sensitivity thereof varies considerably depending on the direction of mounting and hence this type of receiver set is very inconvenient to use in certain cases.

The present invention intends to eliminate the disadvantages of the prior art device and to provide a radio receiver set of high performance with a simple construction.

According to the present invention, an excellent advantage of attaining a maximum receiving sensitivity condition is obtained by rotating only an antenna housing while maintaining the body of the radio receiver set stationary.

Figure 1:
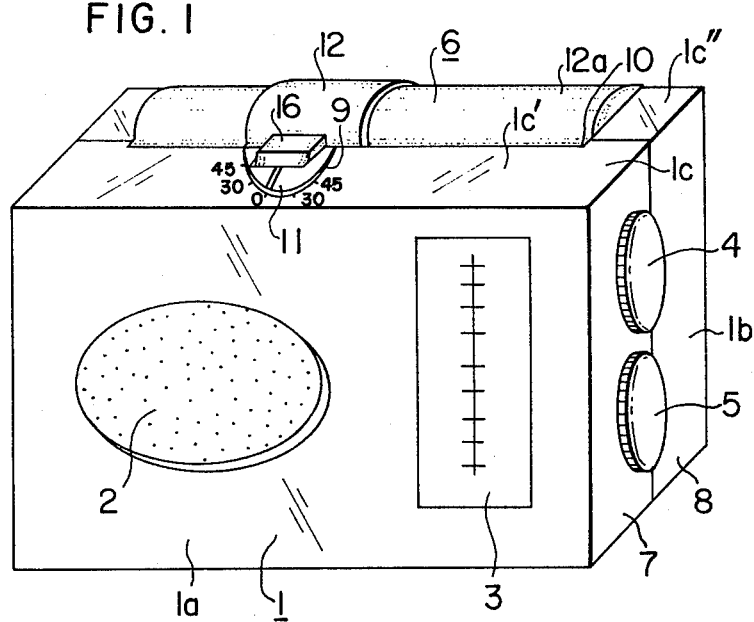
FIG. 1 is an outer perspective view of a radio receiver set illustrating one embodiment of the present invention.
Figure 2:
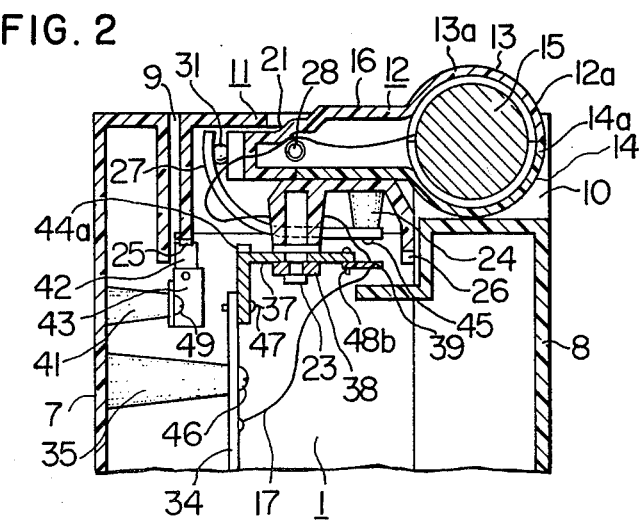
FIG. 2 is a sectional view of a major portion thereof.
Figure 3:
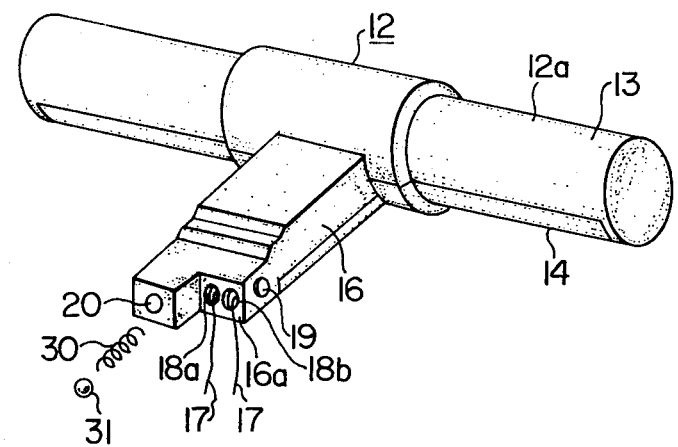
FIG. 3 is a structural perspective view of an antenna housing thereof.
Figure 4:
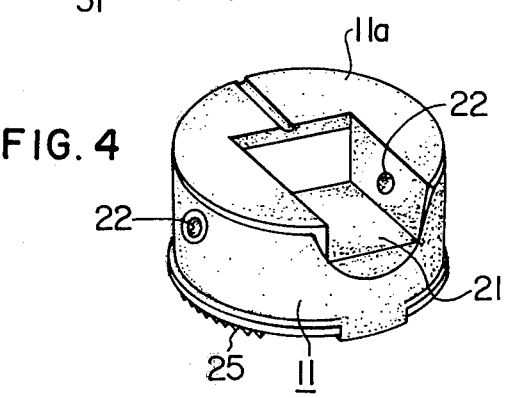
FIGS. 4 and 5 are structural perspective views of a rotary body thereof.
Figure 5:
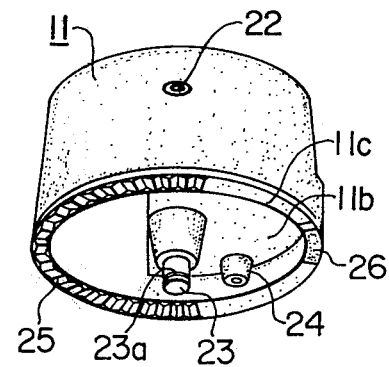
Figure 6:
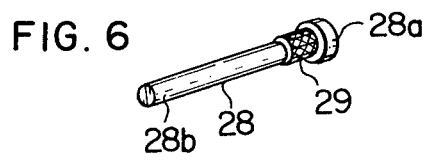
FIG. 6 is a structural perspective view of a mounting pin thereof.
Figure 7:
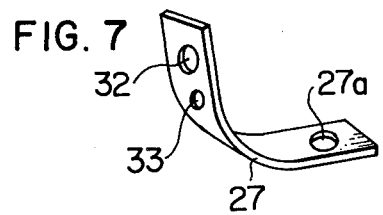
FIG. 7 is a structural perspective view of a curved member thereof.
Figure 8:
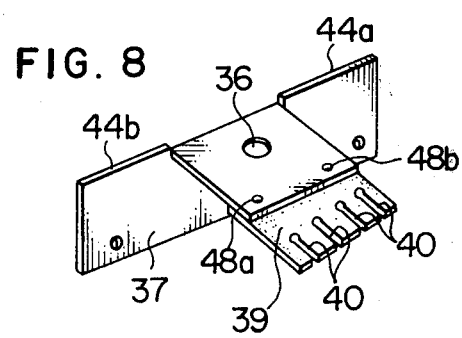
FIG. 8 is a structural perspective view of a mounting member thereof.

One embodiment of the present invention will now be described in detail with reference to the accompanying drawings.

In the drawings, 1 designates a cabinet constituting a body of a radio receiver set, 2 a speaker mounted on a front panel 1a of the cabinet, 3 a dial indicator formed on the front panel, 4 and 5 knobs, such as tuning knob, volume control knob or the like, mounted on a side wall 1b of the cabinet 1, and 6 a rotary antenna device mounted on a top plate 1c of the cabinet.

The cabinet 1 is formed by a cabinet body 7 and a cabinet cover 8 fitted thereto. At the center of a top plate 1c' of the cabinet body 7 a circular recess 9 is formed, and at a portion of a top plate 1c'' of the cabinet cover 8 a recess 10 which communicates with the circular recess 9 is formed.

The rotary antenna device 6 comprises a hollow rotary body 11 which is rotatably mounted in the circular recess 9 and an antenna housing case 12 which is mounted in a manner to allow the adjustment of elevation angle to the rotary body 11 and removably inserted into the recess 10. The antenna housing case 12 comprises a case body 13 and a case cover 14 fitted thereto, and within a hollow antenna housing 12a a rod ferrite antenna 15 is housed while it is held by a rib 13a formed on the case body 13 and a rib 14a formed on the case cover 14. At the center of the antenna housing 12a of the antenna housing case 12 there is formed a hollow arm 16 extending transversely in the longitudinal direction of the antenna housing case 12. In an end plane 16a of the arm there are formed apertures 18a, 18b through which lead wires 17 of an antenna coil 15a wound on the rod antenna 15 are passed, an aperture 19 which constitutes means, to be described later, for mounting said rotary body 11 in a manner to allow the adjustment of elevation angle, and a round recess 20 which constitutes means for holding the antenna housing case 12 in a given angular position.

On a top plane 11a of the rotary body 11 a recess 21 which communicates with the interior thereof is formed, and a through hole 22 extends across the recess 21. At the center of a bottom plate 11b of the rotary body 11 a shaft 23 as well as a boss 24 are formed. On a circumferential bottom plane 11c a knurl 25 as well as a projection 26 are formed. To the boss 24 of the rotary body 11 a curved member 27 is mounted by screwing a mounting bolt 45 into an aperture 27a of the curved member 27.

The antenna housing case 12a thus constructed has its arm 16 fitted into the recess 21 of the rotary body 11, and a mounting pin 28 is inserted into the aperture 22 of the rotary body 11 and the aperture 19 of the arm 16 such that the antenna housing case 12 is mounted in a manner to allow the adjustment of the elevation angle with respect to the rotary body 11. The mounting pin 28 has its head 28a formed in a flat shape and has its neck between a stem 28b and the head 28a formed with a knurl 29. Thus, since the knurl 29 meshes with an inner periphery of the aperture 22 in the rotary body 11 the inadvertent dropping of the mounting pin 28 is prevented. A coiled spring 30 is fitted into the circular recess 20 formed in the arm 16 of the antenna housing case 12 so that steel balls 31 are resiliently biased to the apertures 32 and 33 of the curved member 27.

34 designates a printed circuit board fixed by a mounting screw 46 to a boss 35 formed on the cabinet body 7. A mounting member 37 having an aperture 36 is attached by a mounting screw 47 to the printed circuit board 34. The stem 23 of the rotary body 11 is fitted into the aperture 36 in the mounting member 37 attached to the printed circuit board 34 and an E-ring 38 for preventing detachment is attached to a groove 23a formed at a tip end of the stem 23 so that the rotary body 11 may be rotatably mounted in the circular recess 9 of the cabinet body 7.

One of the lead wires 17 of the antenna coil 15a wound on the rod antenna 15 are fitted in a channel 40 formed in the synthetic resin printed circuit board 39 attached to the mounting member 37 by pins 48a and 48b, and another lead wire is electrically connected to a radio receiver circuit constructed on the printed circuit board 34.

Attached to a boss 41 formed on the cabinet body 7, by a mounting screw 49, is a mounting member 43 having one end of a synthetic resin resilient plate 42 attached thereto, the other end of which is adapted to mesh with the knurl 25 formed on the circumferential bottom plane 11c of the rotary body 11.

The mounting member 37 of the rotary body 11 is symmetrically formed with shoulders 44a and 44b, to which the projection 26 formed on the circumferential bottom plate of the rotary body 11 abuts as the rotary body 11 rotates.

In the radio receiver set thus constructed, when the antenna housing case 12 is housed in the recess 10 of the cabinet cover 8 as shown in the drawing, the steel ball 31 spring biased at the arm 16 of the antenna housing case 12 is fitted into one of the apertures 32 of the curved member 27 mounted on the rotary body 11, and forced into the aperture 32 by the action of the coiled spring 30. As a result, the antenna housing case 12 is prevented from inadvertently moving out of the cabinet 1.

When the antenna housing case 12 is drawn out of the recess 10 of the cabinet cover 8 while pivoting it around the mounting pin 28, the steel ball 31 spring biased at the arm 16 of the antenna housing case 12 is fitted into the other aperture 33 of the curved member 27 mounted on the rotary body 11 and forced into the aperture 33 by the action of the coiled spring 30. Thus, the antenna housing case 12 remains in position out of the cabinet 1. In this position, when the antenna housing case 12 is pivoted, it is pivoted around the stem 23 of the rotary body 11.

In this case, since the knurl 25 formed on the circumferential bottom 11c of the rotary body 11 is scratched by the resilient plate 42, a clicking sound is generated offering a feeling of the movement of the rotation angle (orientation) of the antenna housing case 12. When the antenna housing case 12 is rotated through a given angle, the projection 26 of the rotary body 11 rotated therewith abuts against the shoulder 44a or 44b of the mounting member 37 to prevent further rotation of the antenna housing case 12.

As seen from the above description, the radio receiver set of the present invention comprises the rotary body rotatably mounted on the top plate of the cabinet constructing the radio receiver set, and the antenna housing case is mounted on the rotary body in a manner to allow the adjustment of the elevation angle, the antenna housing case being provided with holding means for maintaining the selected elevation angle position. According to the present invention, by rotating the antenna housing case while it is kept in the selected elevation angle position with respect to the rotary body, a maximum receiving sensitivity condition can be attained only by rotating the antenna housing case while maintaining the radio receiver set body stationary. This offers very convenient feature in use.

Figure 9:
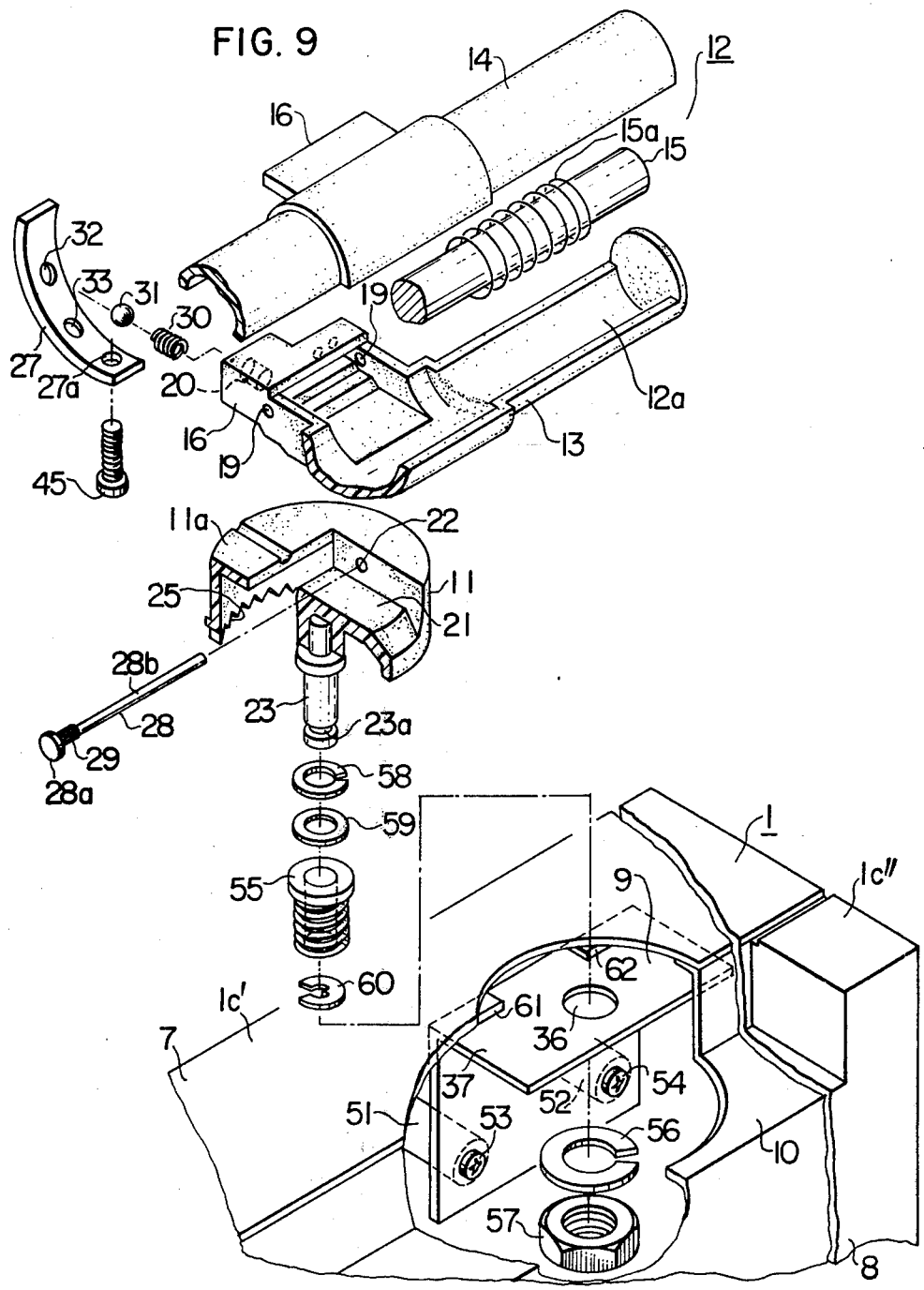
FIG. 9 is a disassembled view of a major portion of the antenna housing and relating portions thereof.

While the mounting member 37 is attached to the printed circuit board 34 in the above illustrated embodiment, the mounting member 37 may be mounted to bosses 51, 52 formed on the cabinet 7 by mounting screws 53 and 54, as shown in FIG. 9. When the shaft 23 of the rotary body 11 is to be pivoted to the mounting member 37, as shown in FIG. 9, a metal member 55 may be attached to the aperture 36 of the mounting member 37 by a spring washer 56 and a nut 57, and the stem 23 of the rotary body 11 may be inserted into the metal member 55 through a spring washer 58 and a flat washer 59 and an E-ring 60 may be fitted into the channel 23a formed at the tip end of the stem 23 to pivotably mount the stem 23. The projection 26 for limiting the rotation, formed on the rotary body 11 may be constructed to abut against the shoulders 44a, 44b of the mounting member 37 or it may be constructed to abut against projection 61, 62 formed on the cabinet 7, the projections being positioned in the circular recess 9 formed in the cabinet 7, as shown in FIG. 9.

In FIG. 9, these reference numerals which are identical to those used in FIGS. 1 through 8 indicate the same elements or parts.

What is claimed is:

1. A radio receiver set having a rotary antenna device comprising:
   a. a cabinet having a top plate with communicating circular and elongated recesses formed therein; a printed circuit board having a radio receiver circuit thereon located within said cabinet; a hollow cylindrical rotary body positioned within said circular recess; and a first mounting member secured within said cabinet, said rotary body being pivotably mounted to said first mounting member; and
   b. a hollow antenna housing case positioned within said elongated recess; a ferrite rod antenna located within said antenna housing case and electrically connected to the radio receiver circuit on said printed circuit board; a second mounting member, said antenna housing case being pivotably mounted to said rotary body by said second mounting member to permit adjustment of the elevation angle of said antenna housing case with respect to said rotary body; and a click mechanism between said antenna housing case and said rotary body for positioning said antenna housing case at a selected elevation angle, said case being held at a selected elevation angle by said click mechanism when said case is withdrawn from said elongated recess and rotated with said rotary body with respect to said first mounting member.

2. A radio receiver set according to claim 1, wherein said hollow cylindrical rotary body includes a stem positioned within an aperture in said first mounting member; wherein said antenna housing case includes a hollow arm and said second mounting member comprises a mounting pin, said arm being pivotably mounted to said rotary body by insertion of said mounting pin through apertures in said arm and said rotary body; and wherein said ferrite rod antenna has an antenna coil wound thereon, the leads of said antenna coil being electrically connected to the radio receiver circuit formed on said printed circuit board through the hollow arm of said antenna housing case and said hollow rotary body.

3. A radio receiver set according to claim 2, wherein the arm of said antenna housing case has a recess formed at an end plane thereof; and which further comprises an arcuate member having first and second apertures therein mounted on said rotary body; a spring inserted within the recess in the arm of said antenna housing case; and a ball interposed between said spring and said arcuate member, said ball being biased by said spring to fit within said first aperture when said antenna housing case is positioned within said elongated recess and being biased by said spring to fit within said second aperture when the antenna housing case is removed from said elongated recess to retain said antenna housing case fixed in position out of said elongated recess, said antenna housing case being prevented from rotating when in said elongated recess and being rotatable with respect to said cabinet around the stem of said rotary body when out of said elongated recess.

4. A radio receiver set according to claim 3, wherein said mounting pin for pivotably supporting the arm of the antenna housing case to the rotary body has a knurl at a neck thereof, and when the mounting pin is inserted into the aperture formed in said arm and the aperture formed in said rotary body the knurl formed at the neck tightly engages the aperture in the rotary body so that the mounting pin is fixed thereto.

5. A radio receiver set according to claim 3, wherein a projection is formed at a portion of a peripheral bottom plane of the hollow rotary body forming the rotary antenna device, and wherein when the antenna housing case mounted to the rotary body to allow the adjustment of the elevation angle is drawn out of the elongated recess of the cabinet and rotated, the projection formed on said rotary body abuts against the shoulders of the mounting member for mounting the rotary body so that the rotation of said antenna housing case is limited.

* * * * *